(12) United States Patent
Borzym et al.

(10) Patent No.: US 6,352,012 B1
(45) Date of Patent: *Mar. 5, 2002

(54) SUPPORTED SHEAR WITH REVERSIBLE LINEAR DRIVE AND IN-FEED TABLE THEREFOR

(76) Inventors: John J. Borzym, 888 Andover, Northville, MI (US) 48167; Alexander Borzym, deceased, late of Dearborn, MI (US), by John J. Borzym, legal representative ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,811

(22) Filed: Sep. 30, 1997

(51) Int. Cl.$^7$ .................................................. B26D 3/16
(52) U.S. Cl. ............................. 83/186; 83/185; 83/196; 83/199; 83/58
(58) Field of Search .......................... 83/186, 199, 196, 83/54, 58, 185

(56) References Cited

U.S. PATENT DOCUMENTS

| | | | |
|---|---|---|---|
| 2,435,469 A | * | 2/1948 | Roop ............................ 83/186 |
| 3,657,951 A | * | 4/1972 | Clark ............................ 83/199 |
| 4,003,278 A | * | 1/1977 | Shields ......................... 83/186 |
| 4,003,279 A | * | 1/1977 | Carmichael et al. .......... 83/199 |
| 4,548,111 A | * | 10/1985 | Tarbuck ........................ 83/196 |
| 4,631,998 A | | 12/1986 | Borzym ........................ 83/145 |
| 4,635,514 A | | 1/1987 | Borzym ........................ 83/196 |
| 4,794,834 A | * | 1/1989 | Werner ......................... 83/185 |
| 5,065,653 A | * | 11/1991 | Werner ......................... 83/199 |

OTHER PUBLICATIONS

Article "The Basics of Supported Shear Cutting" Tube; Pipe Quarterly, vol. 7, No. 2, Mar./Apr. 1996 pp. 28–30.

* cited by examiner

Primary Examiner—M. Rachuba
Assistant Examiner—Sean Pryor
(74) Attorney, Agent, or Firm—Young & Basile, P.C.

(57) ABSTRACT

A bladeless shear for bar stock and tubing comprising axially adjacent stationary and moving dies which receive the stock and produce a shearing action by relative lateral displacement. A linear actuator or an electric motor produces the mechanical movement to rotate the drive wheel in alternatingly opposite directions. A mandrel for insertion into the tube is disclosed as well as an hydraulic tube clamp and an adjustable in-feed table.

13 Claims, 10 Drawing Sheets

SUPPORTED SHEAR WITH REVERSIBLE LINEAR DRIVE AND IN-FEED TABLE THEREFOR

INTRODUCTION

This invention relates to bladeless shearing of linear stock such as stainless steel tubing and bar stock and, more particularly, to a device which achieves the shearing of stock by causing elliptical, lateral translation of a section of the stock relative to an axially adjacent section.

BACKGROUND OF THE INVENTION

In U.S. Pat. No. 4,635,514 "Elliptical Shearing Apparatus", issued Jan. 13, 1987 to Alexander Borzym, there is disclosed a bladeless device for shearing linear stock, such as bar stock and tubing, by causing a section of the stock to translate laterally through an elliptical path relative to the axially adjacent stock. As is more fully disclosed in the aforesaid patent, this is achieved through the use of a large, steel body referred to as a "die holder" having a central, die-like aperture formed therein which is adapted to receive and precisely surround the linear stock. One side of the die holder is pinned to permit pivotal and limited lateral motion. The other side is connected to a drive mechanism consisting of a large electric motor driving a flywheel at constant speed and a clutch and brake mechanism for selectively and momentarily imparting orbital motion to the die holder. Orbital motion of the die holder around the mechanical drive center produces a unidirectional, elliptical translation of the stock receiving die which lies between the drive center and the pinned end of the die holder. The amplitude of the elliptical motion is a function of the amplitude of the orbital drive motion and the geometric location of the die within the die holder body.

By placing a fixed die also having a stock-receiving aperture immediately axially adjacent to the moveable die, a scissors-like shearing action is produced on a length of stock which is inserted through the two aligned dies; the shear line is defined by the mating plane of the two dies.

There are numerous advantages to a shear of this type relative to cutoffs using blades or other cutting implements. The principal advantages are the elimination of the cutting implement as a perishable component and the conservation of material in the work piece; i.e., saw blades and guillotine blades remove a section of material approximately equal to the thickness of the blade each time it passes through the stock. The resulting loss of material from the stock is significant, particularly where short lengths and high cutting rates are employed.

Another advantage is the quality of the "cut" which can be achieved in the use of the bladeless shear in connection with stock of very hard material such as stainless steel. Blade type cutoffs are known to cause distortion; e.g., burrs and/or dents in the cut tube ends, and very high blade wear when used with hard materials such as stainless steel. The bladeless shear cutoff actually excels when used with materials of this type.

SUMMARY OF THE INVENTION

It has been found that the highest quality result of a bladeless shearing operation is achieved when the amplitude of the die stroke is minimized in relation to the wall thickness of the stock. For example, the optimum shearing quality for tubular stock of low ductility occurs when the maximum relative die translation is approximately equal to the wall thickness of the tubular stock. Since the machine of U.S. Pat. No. 4,635,514 had a fixed stroke, i.e., a fixed dimension of the elliptical path followed by the orbital ram, the optimum performance of the machine was confined to a narrow range of stock. We have, therefore, provided a bladeless shear device in which the stroke is adjustable.

Another advantage of the adjustable stroke in an orbital or elliptical shear is the distribution of the shearing action over a large angular movement of the tooling. This greatly reduces the tendency of prior art shear devices using an L-shaped path and non-adjustable stroke length to "draw" the stock in the shear area.

Through the invention disclosed herein, the drive system of the aforesaid '514 patent has been improved by, in particular, eliminating the clutch and brake mechanism in favor of a direct "linear" drive. Specifically, a reversible linear drive is provided through which the orbital wheel is reversibly driven through successive single revolutions in alternately opposite directions. Relative to prior art systems, this reversible drive promotes longer tool life through more efficient tool edge usage. In one form, the drive comprises hydraulic cylinders driving opposed linear racks which oppositely engage a pinion on the drive shaft of the orbital wheel in the moveable ram. The cylinders are powered by oil from a pump and oil pressure can be managed to provide numerous advantageous results hereinafter described.

In another form, the drive comprises an electrical drive using a reluctance motor and a gear reduction system engaged to the pinion.

It has further been found desirable to provide hydraulic clamping of the work piece and mandrel and a readily adjustable in-feed table which is useful in feeding tubular stock into the shear mechanism during a repetitive shearing operation. This table works in conjunction with novel forms disposed on the mandrel rod to prevent the rod from sagging. These and other advantages of the inventions will be best understood by reading the following specification which describes illustrative embodiments of the inventions in detail.

DETAILED DESCRIPTION OF THE ILLUSTRATIVE EMBODIMENT

General

Figure 1:
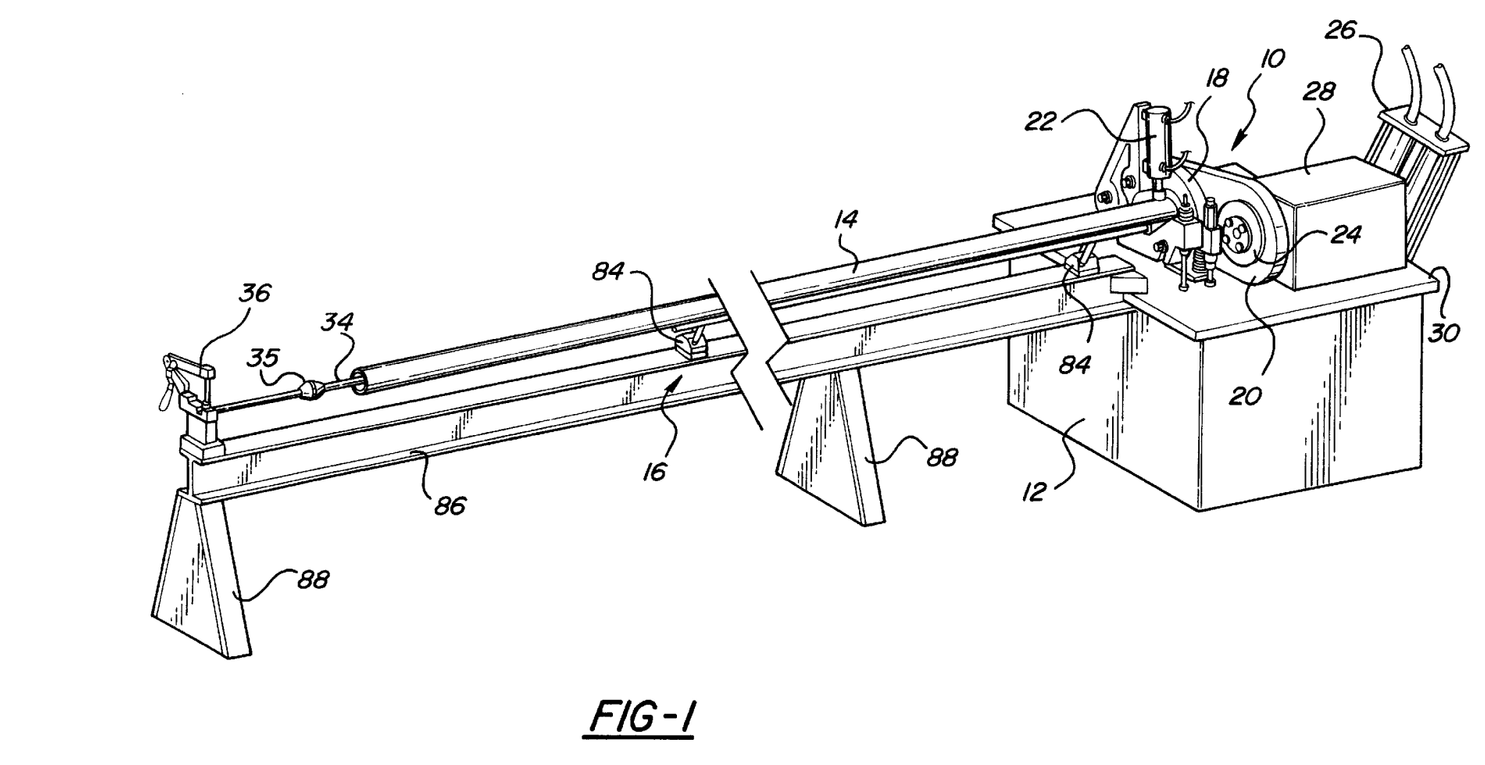
FIG. 1 is a perspective view of a bladeless shear device having an in-feed table which feeds tubing onto a mandrel rod and into the shear from left to right.
Figure 3:
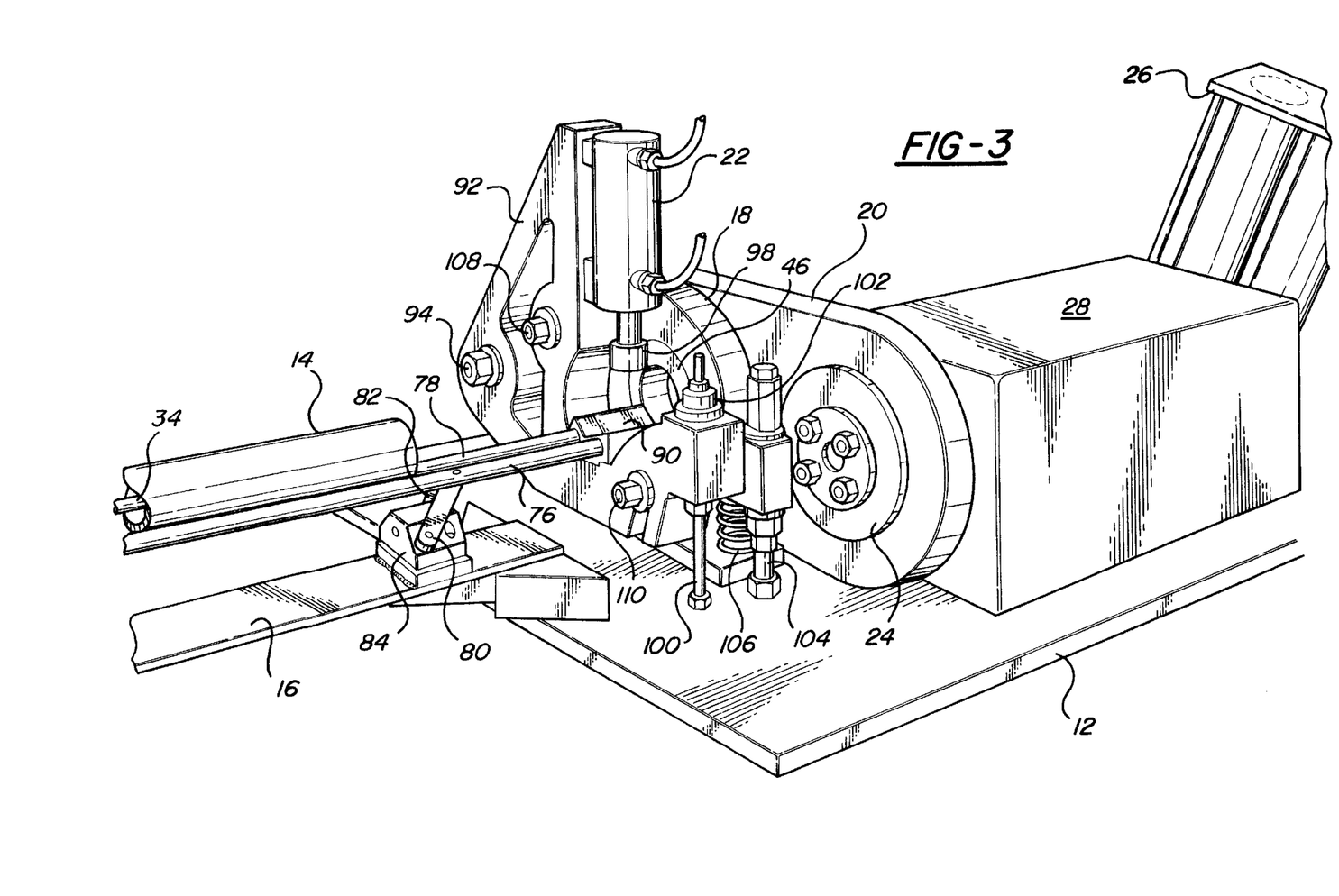
FIG. 3 is a perspective drawing of the bladeless shear device of FIG. 1 enlarged to show detail.

Referring to FIGS. 1 and 3, there is shown a bladeless supported shear device 10 mounted on a rigid steel base 12 for shearing tubular stock 14 which is fed into the device 10 with the help of an in-feed table 16 which underlies and supports the stock. Device 10 comprises a die holder assembly including a stationary ram 18, an axially adjacent orbital ram 20 and a stock clamp 22. The orbital ram 20 comprises a drive wheel 24 which is variably eccentrically driven by an hydraulic linear actuator assembly 26 through a drive shaft housing 28. Base 12 includes a generally planar top 30 of convenient work height for the device 10 which is matched to the height of the in-feed table 16.

The device 10 of FIGS. 1 and 3 is described herein as applied to the shearing of tubular stock of relatively hard; i.e., low ductility, material such as stainless steel. However, it is to be understood that with appropriate die tooling, the device 10 can be used to shear a wide variety of elongate stock including solid or bar stock, round tubing, square, triangular, oblong, rectangular, and polygonal tubing and fabricated shapes, both open and closed, of many shapes and materials.

The apparatus of FIG. 1 includes a mandrel 32 (see FIG. 6) which is inserted into the stock 14 from the end most distal from the device 10 by way of a small diameter rod 34 of adjustable length and which is adapted to be held in position during a shearing operation by means of a manually releasable clamp 36 carried on the end of in-feed table 16. The construction of operation of the device 10 and table 16 will be described on the premise that the stock 14 is being re-cut to lengths, constant or variable, which are selected fractions of the original stock length in preparation for a fabrication operation utilizing the re-cut lengths. It is further premised that the stock 14 is being intermittently fed into the ram assembly of the device 10 and that actuation of the ram assembly to produce the shearing action occurs while the stock 14 is stationary. A suitable systems for automatically feeding stock into the shear device 10 is described in copending application, 09/633,721, filed concurrently herewith in the name of John J. Borzym as sole inventor.

Figure 2:
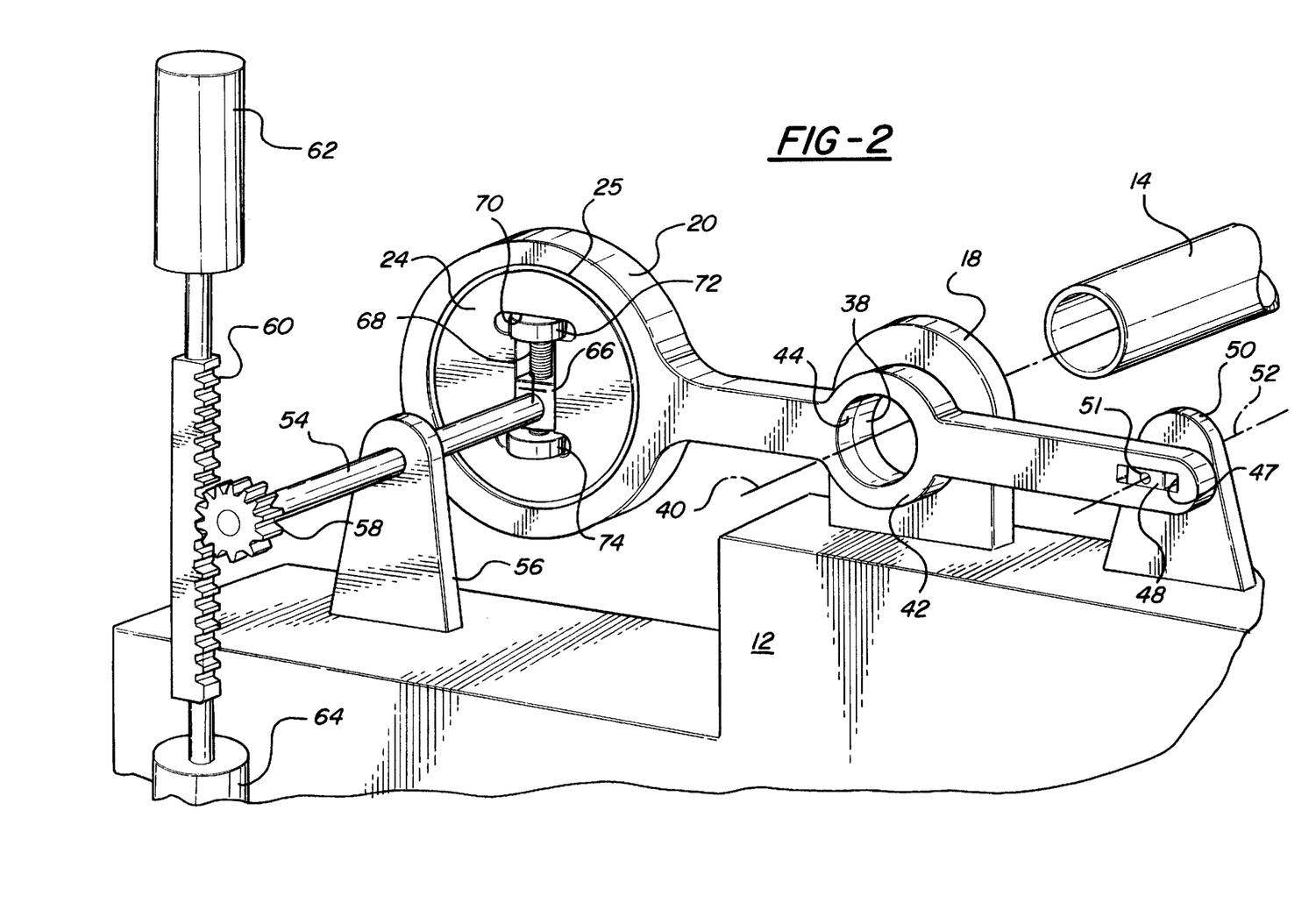
FIG. 2 is a simplified schematic drawing of an adjustable stroke tube shear and linear motor drive useful in explaining the concept of the present invention.
Figure 7:
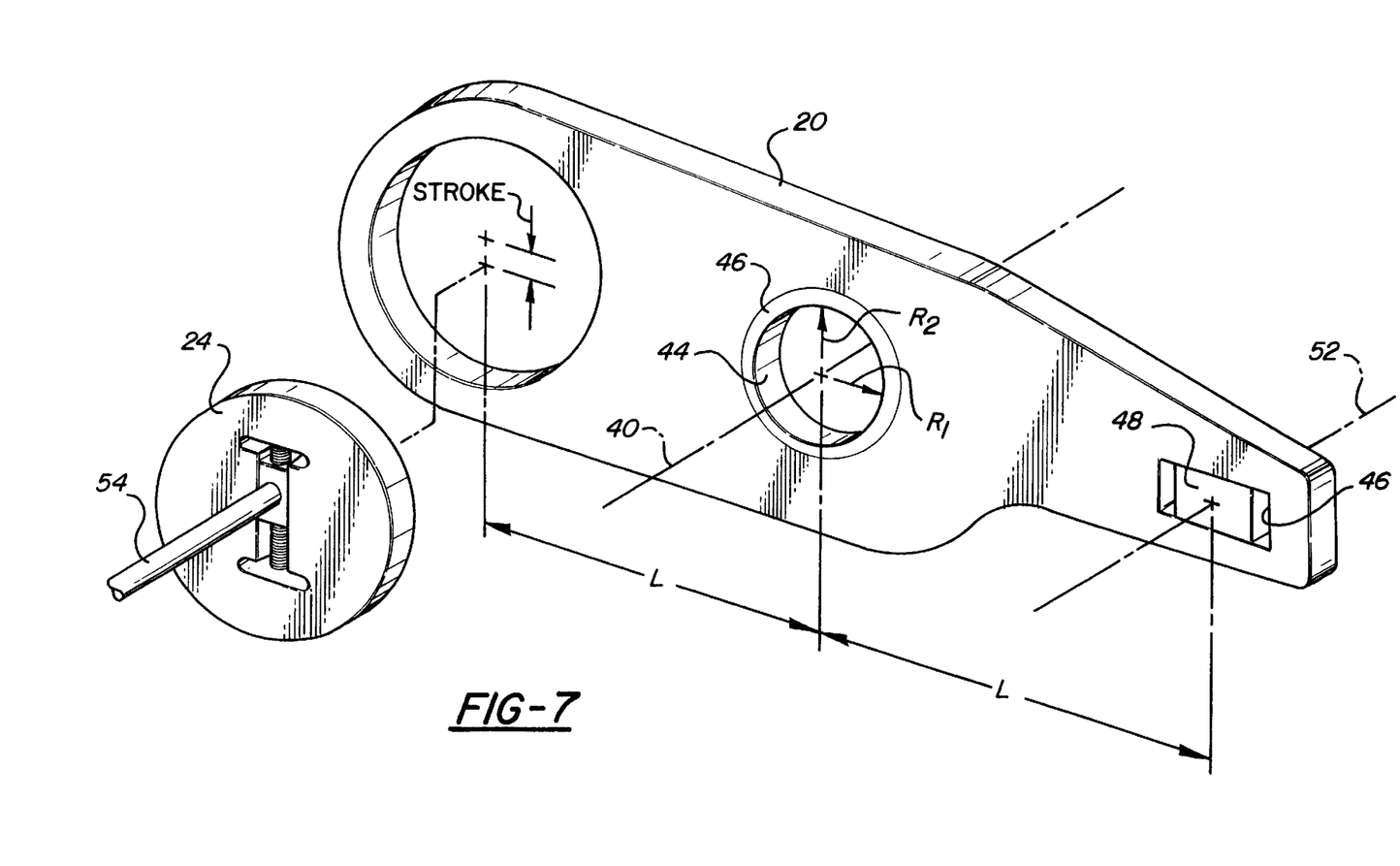
FIG. 7 is a simplified view of the orbital ram and a portion of the drive system useful in explaining certain dimensional relationships of the orbital drive function.

Referring now to FIGS. 2 and 7, a brief description will be made of the principal components of the bladeless shearing device 10 including the linear drive 24, 26, 28 and the functions thereof in shearing the stainless steel tubular stock 14. It will be understood that a mandrel is not needed if the stock is solid and may not be needed if the stock is of an open shape or configuration which can be matched by die openings in the die holder assembly 18, 20.

As shown in FIG. 2, the stationary ram 18 is mounted on the base 12 and has a circular die aperture 38 the shape of which conforms closely to the external surface of the stock 14 and the central axis 40 of which is aligned with the longitudinal axis of the stock. Located in abutting, adjacent relationship to the stationary ram 18 is an orbital ram 20 a central portion 42 of which is provided with a circular die aperture 44 which, in the rest position of the ram 20, is axially aligned with the aperture 38 in the stationary ram 18 thereby to receive the tubular stock 14 and permit the stock to pass through the apertures 38 and 49 to the desired extent. The diameter of aperture 44 is slightly larger than that of aperture 38. The actual shape of the orbital ram 20 is more realistically illustrated in FIGS. 3, 4 and 7, the shape of FIG. 2 being chosen merely for purposes of schematic description; i.e., the shape shown in FIG. 7 provides more strength and rigidity which is required of a tube shearing operation in actual practice. Moreover, the ram 20 is shown in FIG. 7 to include a replaceable tool-steel insert 46 which defines the die aperture 44.

The right-hand side of the orbital ram 20, as shown in FIGS. 2 and 7, is provided with a slot 47 which receives in sliding relationship therein a pivot block 48 which is pivotally mounted on a bearing flange 50 by means of a shaft 51 for pivotal motion about an axis 52 which is parallel to the axis 40 of the apertures 38 and 44. Bearing flange 50 is welded to base 12. The lateral clearances between the block 48 and the slot 47 permit limited lateral movement of the ram 20 relative to the flange 50 for reasons to be explained.

At the left end, as seen in FIGS. 2 and 7, the ram 20 fully surrounds and accommodates therein the drive wheel 24 and a bearing 25 therefor. The wheel is rotatably driven through a shaft 54 supported on the machine base 12 by a fixed support 56. Shaft 54 carries a pinion 58 which meshes with the teeth of a vertical rack 60 which is alternately driven in opposite directions by hydraulic cylinders 62 and 64 which are part of the linear actuator assembly 26.

The shaft 54 is assembled to wheel 24 by way of an integral nut 66 which is trapped within a semi-diametral slot 70 in wheel 24. The nut 66 is threaded to receive a screw shaft 68 having upper and lower thumb wheels 72 and 74. Rotation of the shaft 68 causes movement of the nut 66 along the shaft such that the center of shaft 54 can be displaced to any desired degree from the geometric center of the wheel 24, which center is marked in FIG. 2 by a cross symbol. It can readily be seen that when the center of shaft 54, i.e., the wheel "drive center," coincides with the geometric center of the wheel itself, rotation of the wheel causes no motion of the ram 20 relative to base 12. However, when the drive center is displaced from the geometric center of the wheel 24 as shown in both FIGS. 2 and 7, an eccentric drive is created which forces the center of the ram 20 to follow an orbital path around the center line of the shaft 54. This eccentric motion, although orbital about the shaft centerline, is elliptical in the area of ram portion 42 as hereinafter explained.

In the schematic examples of FIGS. 2 and 7, the distance from axis 52 to the center line of shaft 54 where the slot 70 is vertical is twice the distance from the axis 52 to the axis 40. To state it otherwise, the centerline of the tooling die aperture 44 is exactly midway between the center of wheel 24 and the pivot shaft 50. Accordingly, the radial amplitude of the vertical component of displacement of the axis 40 when the eccentric wheel drive is operative is one-half of the radial displacement of the wheel center+from the center of the shaft 54. However, the amplitude of the lateral displacement of the ram 20 in all places is equal to the radial amplitude of the orbital motion about the center of shaft 54, the clearances between the block 48 and slot 46 permit this lateral translation. Since the amplitude R1 of the lateral ram displacement is twice the amplitude R2 of the vertical displacement at axis 40, the motion of the ram 20 about the axis 40 is elliptical rather than circular. The amplitude R1 is called the "stroke" and is varied by varying its degree of drive eccentricity through thumb wheels 72 and 74.

Figure 6:
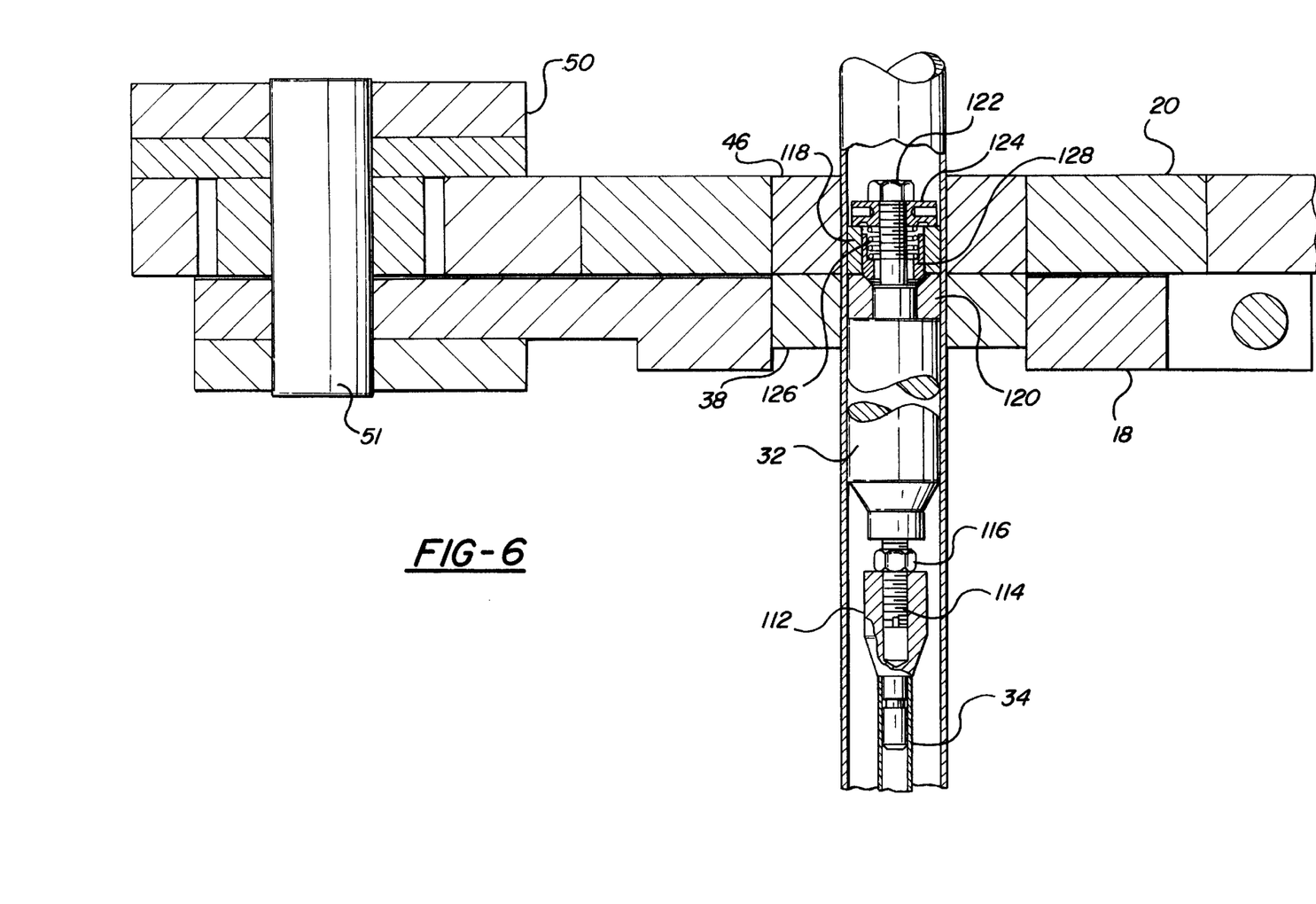
FIG. 6 is a cut away view of the ram and tooling portion of the device of FIG. 1 with the mandrel in place within a length of tubular stock to be sheared.

In operation, the apparatus schematically illustrated in FIG. 2 is set up with the nut 66 displaced from the geometric center of the drive wheel 24 by a distance which is approximately equal to the wall thickness of the tubular stock 14. In addition, the apertures 38 and 44 are arranged so that they are coaxial; in the actual device hereinafter described this requires that the stationary ram 18 be adjustable in vertical position relative to the base 12. The stainless steel tubular stock 14 is fed through the concentric tooling apertures 38 and 44 until the desired shear line of the stock is coextensive with the plane in which the inner diameters of the apertures 38 and 44 meet; i.e. the circular "seam" between the aperture 38 of the stationary ram 18 and the aperture 44 of the orbital ram 20. A mandrel such as 32 in FIG. 6 is placed within the stock 14. As hereinafter explained, the mandrel plays an integral part in the shearing action.

At this time, one of the hydraulic cylinders 62 and 64 is actuated to displace the rack 60 sufficiently to rotate pinion 58 about one revolution. The orbital motion imparted to the wheel 24 by the eccentric drive produces elliptical movement of the shearing ram 20 relative to the stationary ram 18 and the section of the tubular stock 14 within and forward of the aperture 44 is displaced elliptically relative to the axially adjacent section of tubular stock which is held fixed within the aperture 38 of the stationary ram 18. This relative elliptical motion is sufficient to shear or break the material of the tubular stock 14 cleanly in the plane which is co-extensive with the seam between the apertures 38 and 44. Cleanly shorn tube ends requiring little or no secondary operations are the result.

The tubular stock 14 is thereafter advanced until the next shearing location is centered between the stationary and fixed rams 18 and 20, respectively, and the opposite cylinder 62, 64 is actuated to drive the wheel 24 via the shaft 54 through one revolution in a direction opposite to that of the first operation. The intermittent bi-directional translation of the wheel 24 and the ram 20 tends to distribute wear in the area of the apertures 28 and 44, commonly embodied as hereinafter described by expensive alloy steel tooling, around the surfaces of the apertures in a relatively uniform way thereby to substantially improve tooling life relative to the unidirectional drive which was used in the prior art device described above.

Referring now to FIGS. 3–10, a first illustrative embodiment of the invention suitable for commercial application will be described in detail.

Figure 9A:
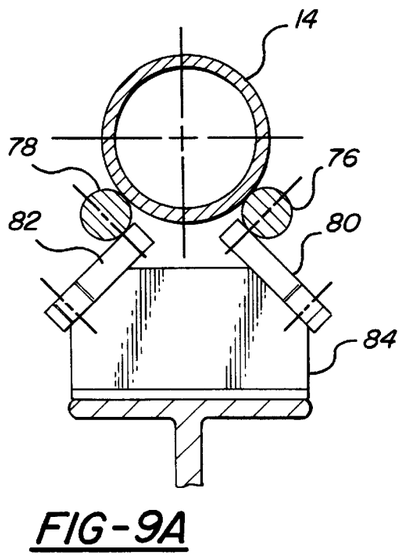
FIGS. 9A and 9B are end views of the in-feed table illustrating the adjustment for different tube sizes.
Figure 9B:
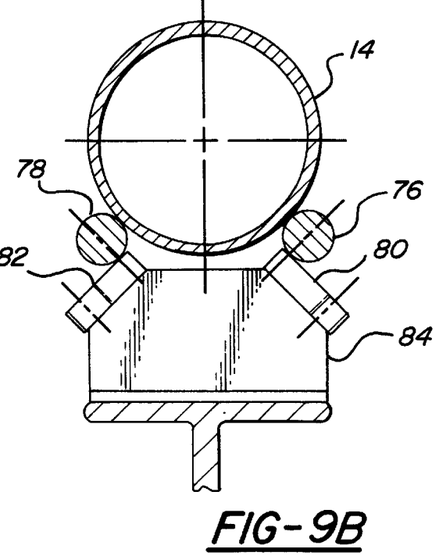
Figure 10:
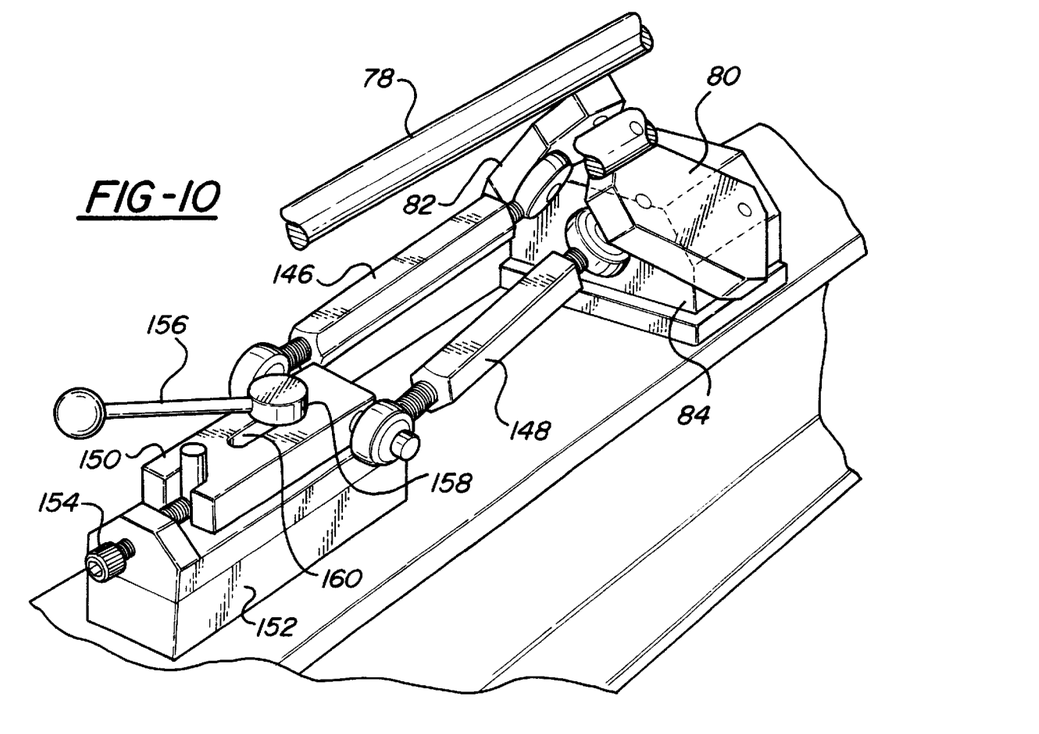
FIG. 10 shows a table detail for adjusting the spread between the elements on which the stock rests.

The in-feed table 16 comprises a pair of spaced parallel solid steel bars 76 and 78 of circular cross section pivotally secured at each of several spaced locations to identical sets of links 80 and 82, respectively, which are pivotally connected to the beveled faces of a series of spaced support blocks 84. The blocks 82 are located at regular intervals along a beam 86 which is carried on fabricated steel legs 88. As shown in FIGS. 9 and 10, the links 80 and 82 may be selectively pivoted in opposite directions to adjust the relative spacing between the rods 76 and 78 as well as the elevation thereof thereby to locate the centerline of the stock 14 such as to align it with the axis of apertures 38 and 44 as described above. The bars 76 and 78, although shown as if circular (round) cross-section and of a diameter which is less than that of the stock 14, may be of other shapes and sizes. It is believed desirable, however, to use a bar shape which, in combination with the stock shape, produces a tangential contact for minimizing contact area.

Figure 4:
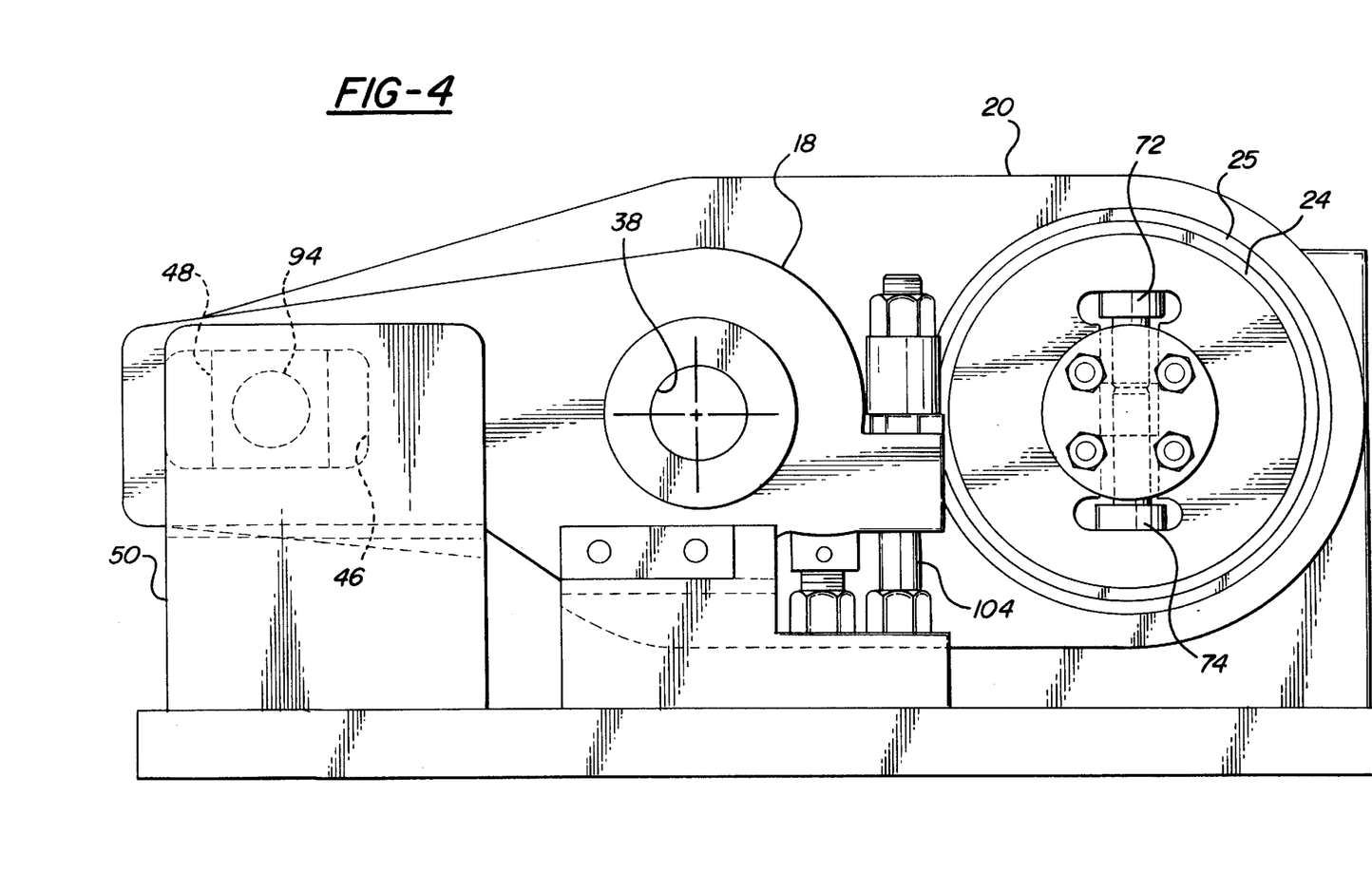
FIG. 4 is a front view of the bladeless shear machine illustrating the arrangement of the stationary and orbital rams and the adjustable orbital drive.

The table 16 is arranged so as to feed the tubular stock 14 onto a notched rest block 90 which is carried within a large steel frame 92 mounted to the stationary ram 18 by way of a bolt 94 which corresponds to pin 51 in FIG. 2 and passes through a hole in bearing flange 50 shown in FIG. 4. The axis of the bolt 94 corresponds with the axis 52 shown in FIG. 2; i.e., it is the lever axis or fulcrum about which the orbital ram 20 is caused to pivot by operation of the linear drive. Frame 92 carries the hydraulic cylinder 22 having a vertically extending plunger 98 disposed immediately over the noted support block 90 so as to effectively clamp the portion of the tubular steel stock 14 in which mandrel 32 is located during a shearing operation. The clamp cylinder 22 stabilizes the mandrel 32 and prevents the stock 14 from whipping during the shear operation; such whipping action can produce the undesirable result of non-square tube ends.

The elevation of the clamp block 90 is adjusted to accommodate the particular stock by way of an adjustable leg 100 which extends vertically through an integral portion of the frame 92, as shown in FIG. 3 and has suitable locking means at 102.

The stationary ram 18 lies between and immediately adjacent each of the frame 92 and the orbital ram 20 and is provided with a tool steel insert 46 having formed therein the aperture 44 which closely surrounds and holds the tubular stock 14 during the shearing operation. To permit alignment of the apparatus as hereinbefore described and to accommodate tubular stock of varying outside diameter, the stationary ram 18 is also mounted on the bolt 92 for pivotal motion about the axis 52 which is the common pivot axis to the frame 92 and the fixed ram 18. A support leg 104 is mounted on the stationary ram 18 and extends in adjustable threaded relationship into the base 12. A compression spring 106 urges the right side of the ram 18 in the counterclockwise direction as shown in FIG. 3 to maintain tension in the bolt 104. The frame 92 and the stationary ram 18 are preferably fastened together so they can be moved and/or adjusted as a unit by through bolts 108 and 110 which extend parallel to the axis of the tubular stock 14. The nuts on bolts 108 and 110 are tightened once proper alignment has been achieved.

Figure 5:
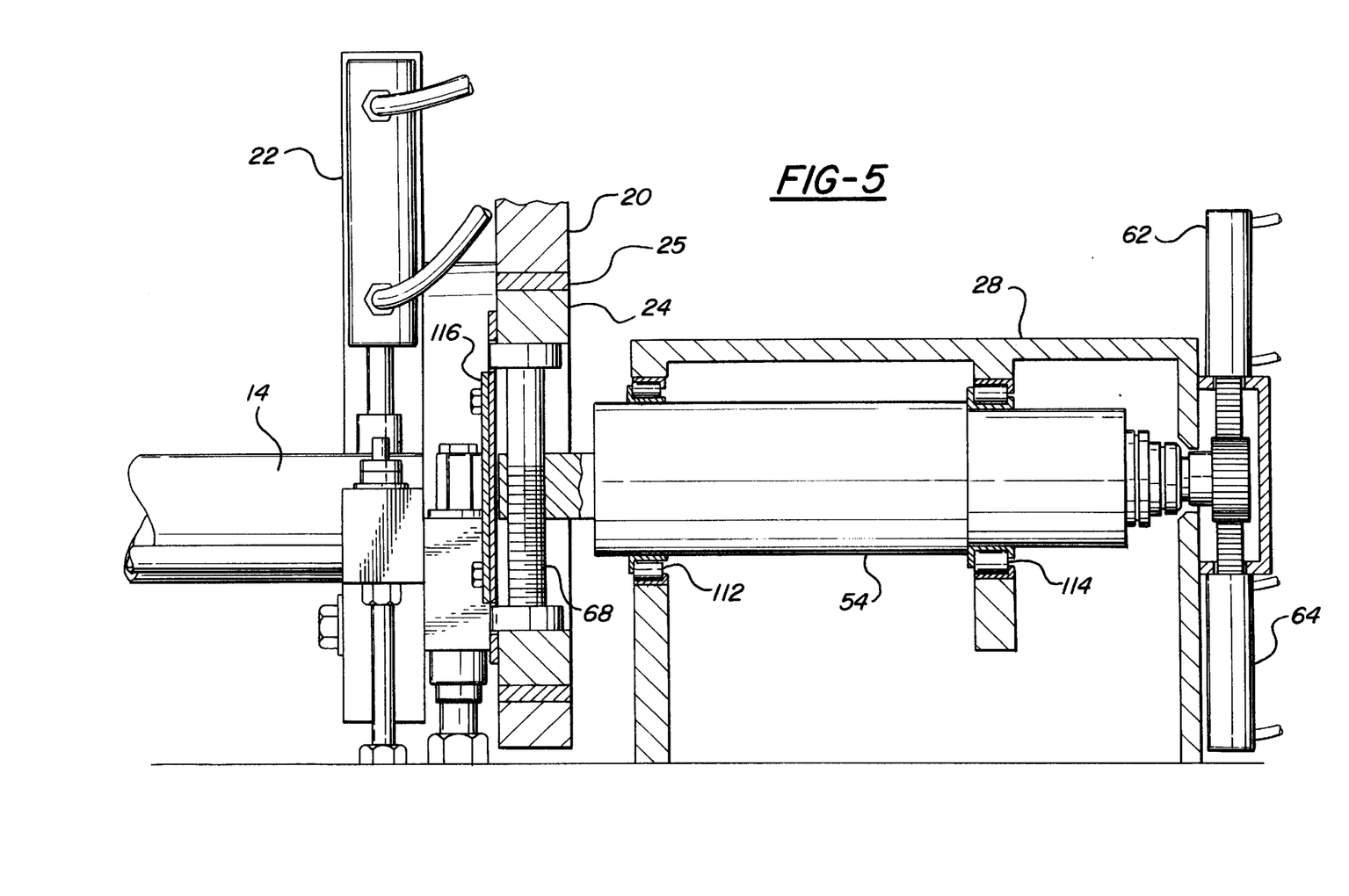
FIG. 5 is a side view partly in section to show details of the linear drive.

As best shown in FIG. 5, the transmission housing 28 contains a stepped steel shaft 54 having two different but relatively large outer diameters seated in bearings 112 and 114 for rotation about the central axis of the shaft 54. The right-hand end of the shaft 54, as shown in FIG. 5, is splined to receive the pinion 58 shown in FIG. 2 but removed for clarity in FIG. 5. Pinion 58 meshes with the racks of the two-way linear drive as hereinafter described. The left side of the shaft 54 is of polygonal configuration to define nut 66 and extends into the slot 70 in the drive wheel 24 to engage the threaded shaft 68 disposed therein. A plate 116 covers the slot 70 during operation as shown in FIG. 5.

Looking now to FIG. 6, the details of the mandrel 32 which is disposed within the tubular stock 14 during shearing operations to prevent collapse and/or deformation of the stock wall will be described. The mandrel 32 is a bullet-shaped steel body mounted on shaft 34 which permits the mandrel to extend through a long length of tubular stock and precisely located so that critical portions of the mandrel correspond in location with the shear line at the interface between the shear tooling hereinbefore described. The shaft 34 terminates in a flared end collar 112 having a threaded axial bore which receives therein the threaded end of a rod 114 to permit length adjustments. Nut 116 locks the threaded rod 114 relative to the collar 112 when the appropriate length is achieved.

The body of mandrel 32 is essentially cylindrical and its internal diameter closely approximates that of the interior of the tubular stock 14. It is long enough to lie between the dies 18 and 20 and to lie within the stock 14 under the clamp 22.

The distal end of the mandrel 32 is provided with an assembly which comprises a threaded center shaft, a fixed annulus 120, a laterally moveable annulus 118, a cap 124, a compression spring 126, a cam collar 128, and a nut 122. Cam collar 128 has a beveled external bearing surface which mates with a similar beveled interval surface in annulus 120. Spring 126 permits the collar 128 to move radially and axially at the same time against the bias of spring 126. The mating plane or "seam" between fixed annulus 120 and moveable annulus 118 must correspond precisely to the interface seam between the stationary and orbital rams 18 and 20, respectively, during a shearing operation so that one section of stock 14 can move laterally of the adjacent section for shearing purposes.

Looking now to FIG. 8 an hydraulic control system for programming and controlling operation of the linear drive will be described. Pressure (P) and Tank (T) lines 132, 134 are connected in a loop fashion through hydraulic spool valves 136, 137 and 138 each of which is equipped with a conventional internal spool to permit high pressure and tank pressure to be gradually applied to either of the output lines from those valves in a controlled and selectable fashion. Valve 136 is a proportional value and is connected via output lines 139 and 140 to the hydraulic cylinders 62 and 64 to effect displacement of the internal pistons/racks 65 and 66 respectively. These racks engage the teeth of the orbital wheel drive pinion 58 which resides in a box 130 lubricated by pressure tapped from line 139 through a regulator 141.

Figure 8:
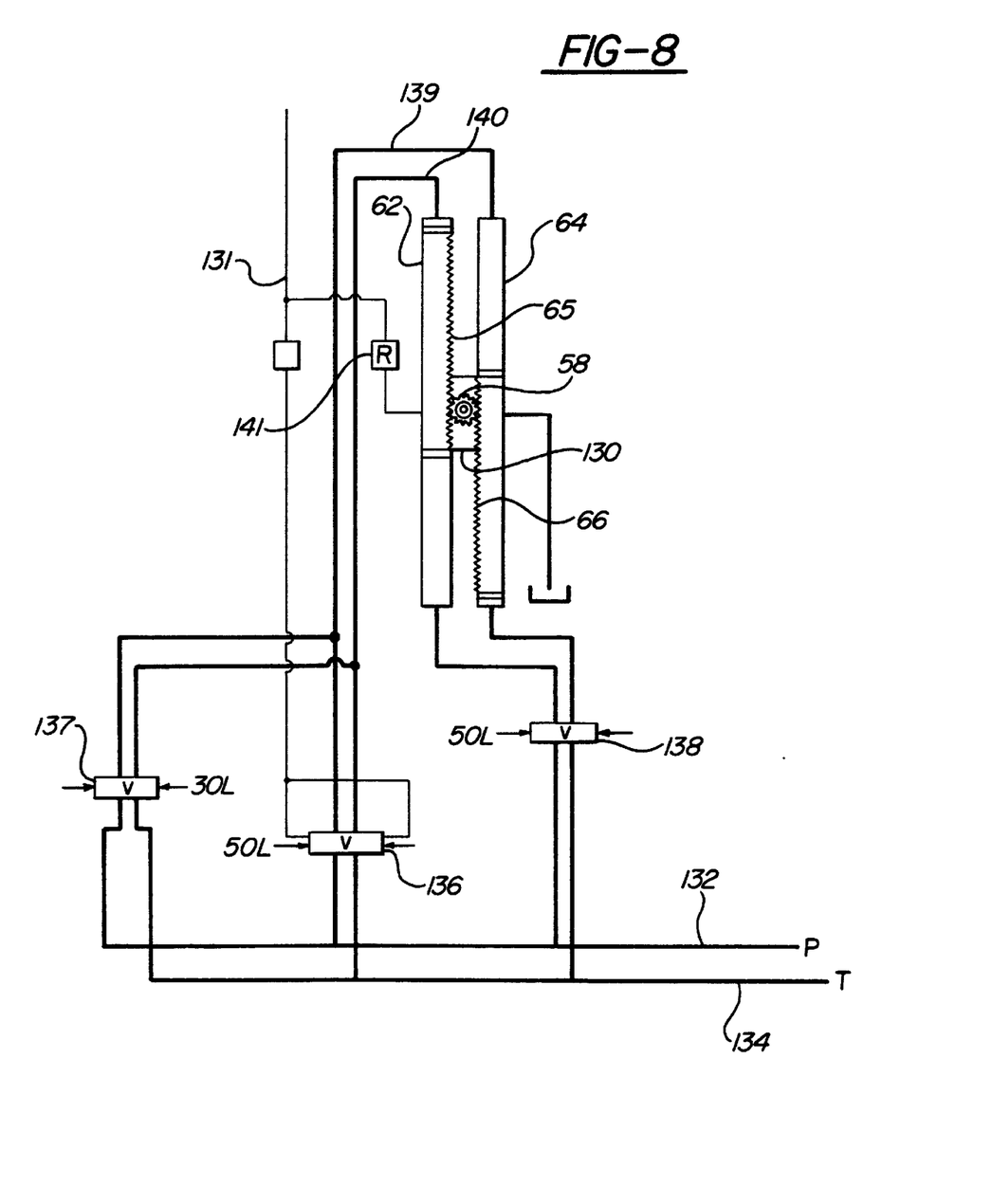
FIG. 8 is a schematic diagram of an hydraulic power system for producing operation of the linear drive.

In the configuration shown in FIG. 8 high pressure (P) will be applied to the top of cylinder 62 to initiate a shear cycle and tank pressure (T) simultaneously applied to the top of cylinder 64 to maintain a small residual pressure against the top of racks/pistons 66. As a result the high pressure drives the racks/pistons 65 downwardly as shown in FIG. 8 rotating the pinion 58 counter clockwise and driving the right hand piston 66 through the pinion 58 upwardly against the slight residual tank pressure. This maintains the teeth of the pinion gears in engagement with the same side of the rack convolutions at all times and eliminates backlash which might otherwise make stopping the orbital wheel at the dead center position more difficult and/or impossible. To drive the piston/racks 65, 66 in the opposite direction the spool in valve 136 is shifted by an appropriate input signal to a position which reverses the pressure value on the output line. The cylinders 62 and 64 are provided with precisely adjustable mechanical stops which correspond to and actually define the top-dead-center position.

Valve 137 is used to selectively "jog" the pistons for any of a variety of operations including test and die assembly procedures. Valve 138 is available to provide a torque boost in the event a particularly hard or heavy wall thickness material is to be shorn.

It will be apparent to those skilled in the hydraulic control arts that the valves 137 and 138 are controlled by solenoids which in turn are controlled from a conventional control panel having push buttons, switches, and similar input/output devices. Valve 136 is preferably controlled by hydraulic pressure through a pilot line 131.

Looking to FIGS. 9A, 9B and 10, the in-feed table 16 is shown to comprise solid steel rods 76 and 78 forming tube rests and mounted in pivotal links 80 and 82 The angles of the links 80, 82 relative to the block 82 are determined individually by turnbuckles 146 and 148 connected to opposite sides of slotted slide block 150 mounted on base 152. The longitudinal portion of block 150 relative to base 152 can be adjusted via Allen-head screw 154. The selected portion is then maintained or locked-in by clamp lever 156 attached to clamp head 158 the integral bolt of which extends downwardly through the set 160 into a tapped hole in base 152. It will be noted from FIGS. 9A and 9B that the included angle between the contact points of the rests 76, 78 and the tube 14 remain nearly the same over a range of adjustments. Thus, the in-feed table rests can be narrowed or spread without creating a shallow unstable tube rest.

Table 16 underlies and supports the tubular stock 14 as it is fed into the shear device 10. By supporting the tubular stock, table 16 also supports the mounted rod 34 shown in FIG. 1 and prevents it from sagging. To this end, cast iron forms 35 are mounted on the rod 34 at 4 foot intervals and have outside diameters which closely approximate the inside diameter of the stock 14 to hold the rod 34 straight and prevent movement of the mandrel relative to the shear plane. This instrumentality greatly increases the life of the tooling. The material of forms 35 can be other than cast iron but is preferably somewhat softer than the material of the work piece so as to be "sacrificial" in the event of interference which might otherwise mar the work piece.

In operation, a first shearing stroke is initiated by opening valve 136 to actuate cylinders 62 and 64 in the manner described above. This rotates the pinion 58 one revolution of the drive wheel 24. On the next cycle, the cylinders 62 and 64 are actuated in the opposite direction by opening valve 136 to apply "P" and "T" pressures to opposite cylinders.

Figure 11:
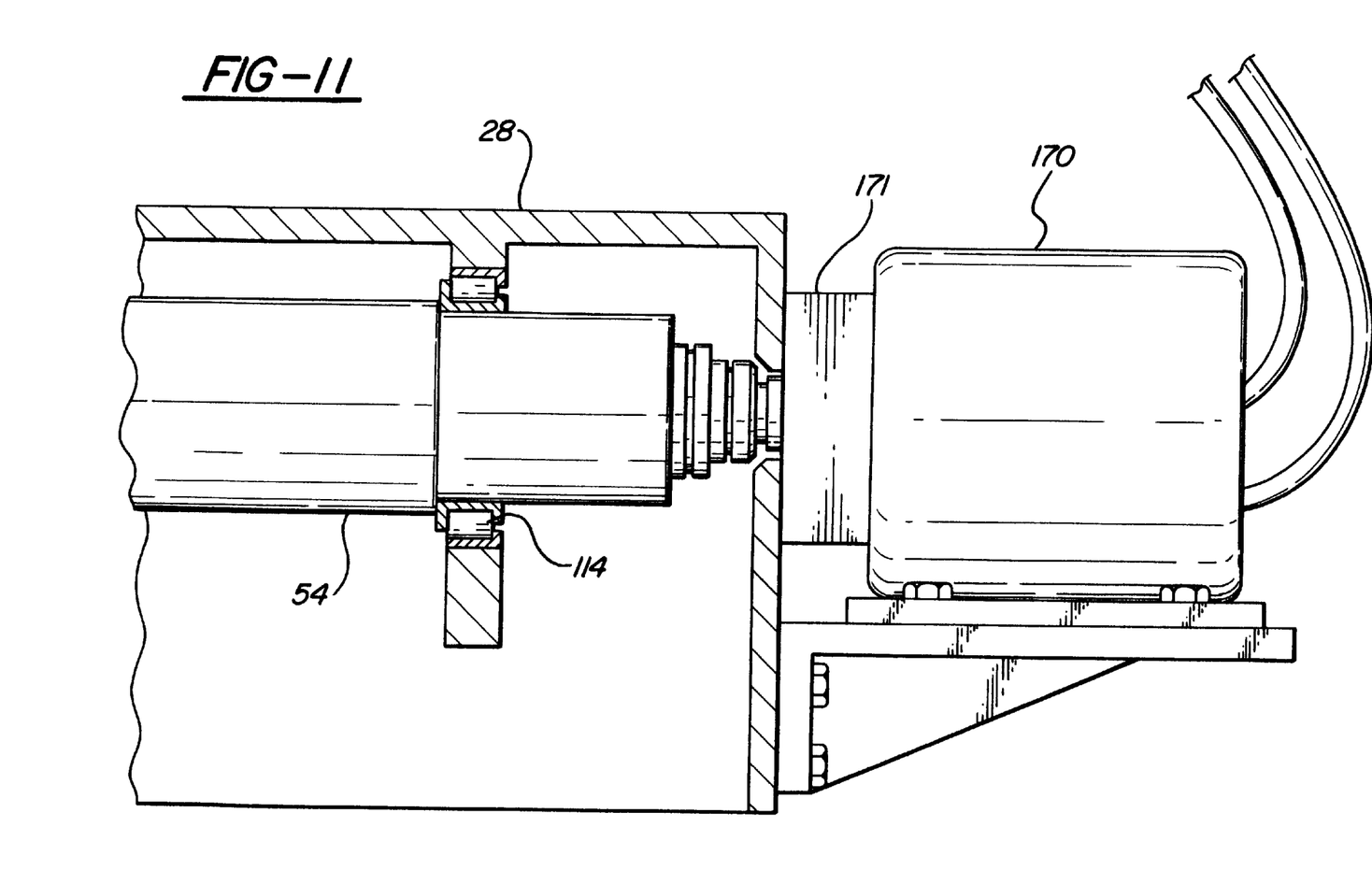
FIG. 11 is a schematic drawing of the electric motor embodiment of the linear drive.

A suitable apparatus for implementing the linear drive including the hydraulic cylinders, the racks, and the pinion, as well as the high pressure hydraulic pump 132 and its power supply is available from FLO-TORK, Inc. of Orrville, Ohio 44667. FLO-TORK, Inc. refers to the product as an hydraulic rotary actuator. FIG. 11 illustrates an alternative power source in the form of a reversible electric motor 170 connected to the shaft 54 in unit 28 through a reduction gear unit 171. The assembly 28 is otherwise the same as the arrangement shown in FIG. 5. The motor 170 is preferably of the reluctance type and may be precisely controlled as to direction and stopping location by means which will be apparent to persons familiar with feedback position control systems.

What is claimed is:

1. A supported shear for shearing linear stock into desired lengths by relative lateral displacement of stock-receiving tooling along a shear plane essentially at right angles to said lengths comprising:
    a non-driven ram having tooling for receiving length of stock;
    a driven ram movably disposed immediately adjacent the non-driven ram and having tooling essentially alignable with the tooling of the non-driven ram for receiving said length of stock; said shear plane lying between the non-driven and driven rams;
    means mounting said driven ram for movement of said tooling through an orbital path relative to the tooling of the non-driven ram;
    a power source for selectively driving said driven ram and tooling through said orbital path; and
    means connected between said power source and said driven ram for varying a radius of the orbital path.

2. Apparatus as defined in claim 1 wherein said driven ram comprises:
    a rigid body having a pivotal mount and, at non-equal distances from said pivotal mount, a stock-receiving aperture and a drive wheel.

3. Apparatus as defined in claim 2 wherein said power source comprises a drive shaft connected to rotate said drive wheel.

4. Apparatus as defined in claim 3 wherein said mechanical connection comprises apparatus for moving the center of said drive shaft relative to the center of said wheel.

5. Apparatus as defined in claim 4 wherein said apparatus for moving comprises:
   a semi-diametral slot formed in said wheel;
   a threaded stroke-adjustment shaft disposed within said slot with the longitudinal axis thereof lying along a diameter of said wheel; and
   a nut mounted on said stroke-adjustment shaft and trapped within said slot for selective displacement within said slot by selective rotation of said shaft;
   said drive shaft being connected to said nut.

6. Apparatus as defined in claim 2 wherein the distance between the pivotal mount and the center of the drive wheel is approximately twice the distance between the pivot mount and the center of the stock-receiving aperture.

7. Apparatus as defined in claim 2 further comprising:
   a support base;
   said non-driven and driven rams being mounted on said support base; and
   means for adjusting the position of the non-driven ram relative to said base about a pivot axis which is common to said pivotal mount.

8. Apparatus as defined in claim 1 wherein:
   said stock is tubular; and
   said shear further comprising a mandrel extensible into said stock in the location of the shear plane to maintain the shape thereof during a shearing operation.

9. Apparatus as defined in claim 8 further including means for clamping and immobilizing said mandrel and said stock in the portion thereof occupied by said mandrel.

10. Apparatus as defined in claim 8 wherein:
    said mandrel comprises a rigid body having a longitudinal axis and an outer shape which correspond essentially to the inner shape of said stock;
    said mandrel comprising a first axial portion which extends into said stock and a second axial portion adjacent to the first axial portion which extends into said stock;
    said second portion being compliantly laterally moveable relative to said longitudinal axis as said driven ram means is translated orbitally during a shear operation.

11. Apparatus as defined in claim 1 wherein the orbital path is elliptical.

12. A supported shear of the type having coaxial and longitudinally adjacent fixed and movable tooling for receiving and shearing a workpiece therein and defining shearing plane therebetween comprising:

(a) means for holding the fixed tooling in a stationary position;

(b) means for moving the movable tooling through an elliptical path relative to the fixed tooling so that it is coaxial therewith at only one location along the elliptical path; and (c) means for selectively varying a radius of the elliptical path.

13. In a shear apparatus of the type having fixed and movable rams supporting fixed and movable workpiece receiving tooling respectively:

(a) means for mounting said driven ram for composite pivotal and lateral displacement relative to a pivot point;

(b) means placing said tooling in said ram at a first distance from said pivot point;

(c) a drive wheel disposed within and wholly circumscribed by said driven ram at a second distance from said pivot point;

(d) a crank shaft and power source for driving said wheel; and (e) means for progressively varying the drive attachment point between the crank shaft and the wheel along a radius thereof.

* * * * *